April 10, 1928.　　　　　　　　　　1,665,538
R. G. ELLIS
VEHICLE BRAKE
Filed March 30, 1927　　　3 Sheets-Sheet 1

Inventor
R. G. Ellis
By Lacey & Lacey, Attorneys

April 10, 1928.  R. G. ELLIS  1,665,538

VEHICLE BRAKE

Filed March 30, 1927  3 Sheets-Sheet 2

Inventor
R. G. Ellis

By Lacey & Lacey, Attorneys

April 10, 1928.
R. G. ELLIS
1,665,538
VEHICLE BRAKE
Filed March 30, 1927
3 Sheets-Sheet 3
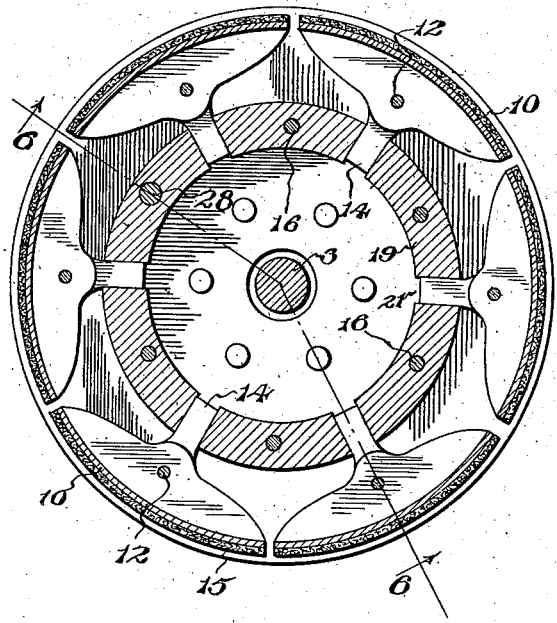
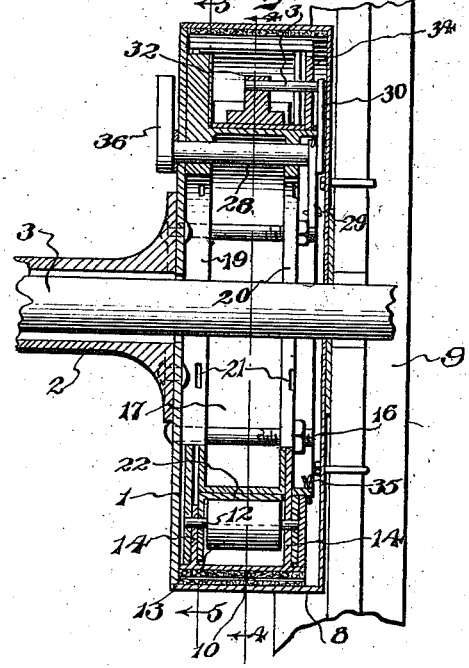
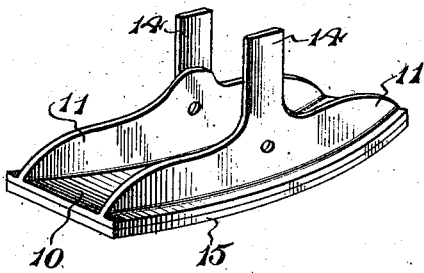
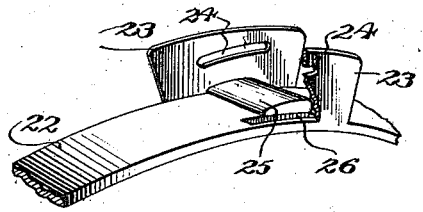
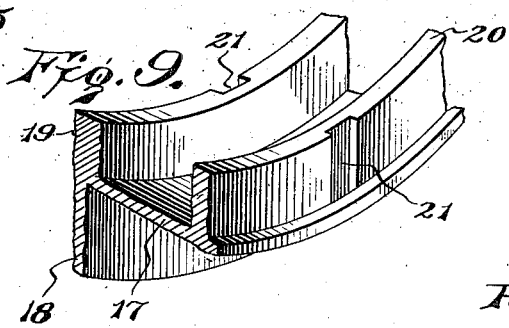
Inventor
R. G. Ellis
By Lacey & Lacey, Attorneys Patented Apr. 10, 1928.

1,665,538

UNITED STATES PATENT OFFICE.

RAYMOND G. ELLIS, OF SNOQUALMIE, WASHINGTON.

VEHICLE BRAKE.

Application filed March 30, 1927. Serial No. 179,555.

This invention relates to brake mechanism for vehicles, and provides an arrangement particularly adapted for automobiles and motor vehicles generally, since the construction admits of the brakes being applied with equal facility to the rear or the front wheels.

One of the main features of the invention is the provision of a brake which obviates adjustment when properly installed, the wear being compensated for by cam lifts until the lining of the brake shoes becomes worn to an extent to require replacement.

The invention also provides a brake which is positive and certain in action, both in the application and the release of the brakes, and which equalizes the wear and stresses and presents a large braking surface to admit of easy control.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

Figure 5 is a sectional view of the brake mechanism on the line 5—5 of Figure 6.

Figure 6 is a transverse sectional view of the brake mechanism on the line 6—6 of Figure 5, looking in the direction of the arrows.

Figure 7 is a detail perspective view of one of the brake shoes.

Figure 8 is a detail perspective view of a portion of the brake operating ring.

Figure 9 is a detail perspective view of a portion of the brake frame.

Corresponding and like parts are referred to in the following description and designated in the several views of the drawings by like reference characters.

Figure 1:
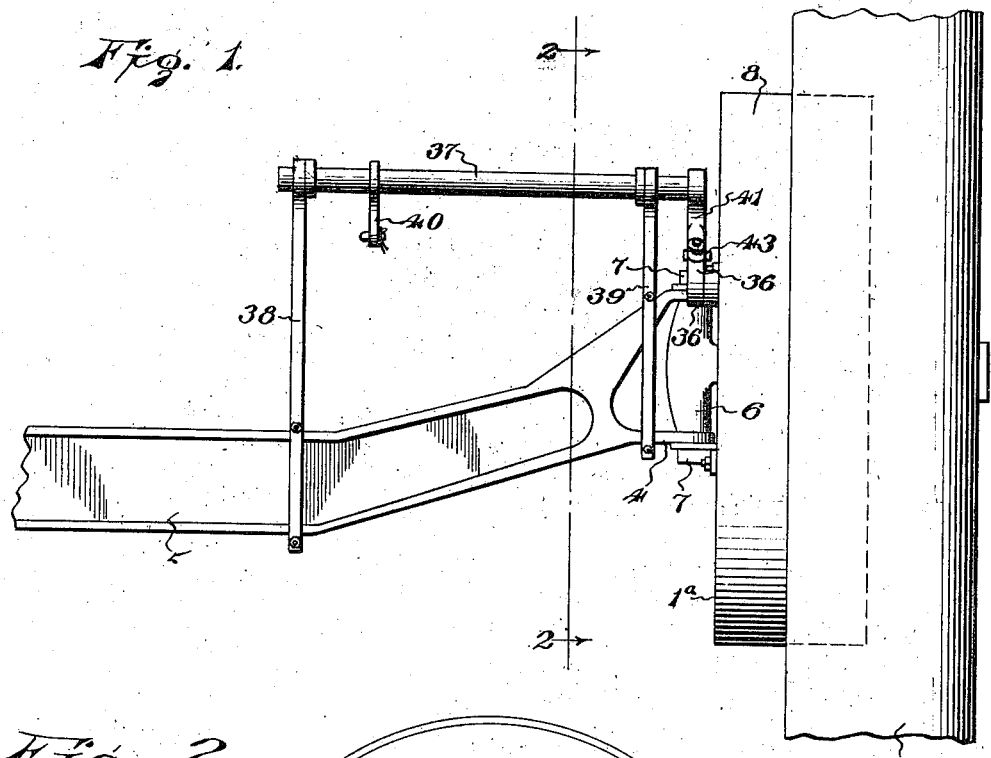
Figure 1 is a front view of an end portion of the front axle of a motor vehicle, provided with a brake mechanism embodying the invention, a portion of the front wheel being shown to illustrate the relative arrangement of the parts.

The numeral 1 or 1ª represents a plate to which the brake mechanism is attached. The plate 1 is riveted or otherwise fixedly attached to the housing 2 of a rear axle 3. The plate 1ª is pivotally connected to the fork members 4 at the outer end of the front axle 5, so as to turn with the front wheel when steering. The spindle bolt passes through the fork members 4, the knuckle 6 at the inner end of the spindle and lugs 7 projecting inwardly from the plate 1ª, thereby pivotally connecting the spindle and the brake supporting plate 1ª to the front axle.

The brake mechanism for each of the four wheels of a vehicle is substantially the same, the main difference residing in the mounting thereof and the connection for operating the brakes. The numeral 8 designates the brake drum, which is adapted to be attached to the wheel 9 in any determinate way. A plurality of brake shoes 10 are grouped about the axle or spindle 3 as the case may be, and are mounted for positive radial movement towards and away from the axis of the wheel. If preferred, the front wheels and the rear wheels of a vehicle may be equipped with brakes having a different number of brake shoes, and the brakes themselves may vary in size, but the construction otherwise will be substantially the same. Each of the brake shoes 10 is formed upon its inner side with transversely spaced webs or flanges 11, which provide reinforcing means and supports for a pin 12 upon which is mounted a roller 13. Arms 14 project inwardly from each of the shoes 10 and are disposed intermediate the ends thereof, and serve as guide means to direct the shoes in their radial movements. Each of the brake shoes 10 has a suitable lining 15 applied to its outer side, to frictionally engage the brake drum 8 of the wheel. The webs or flanges 11 also serve as bracing means for the guide arms 14.

Figure 4:
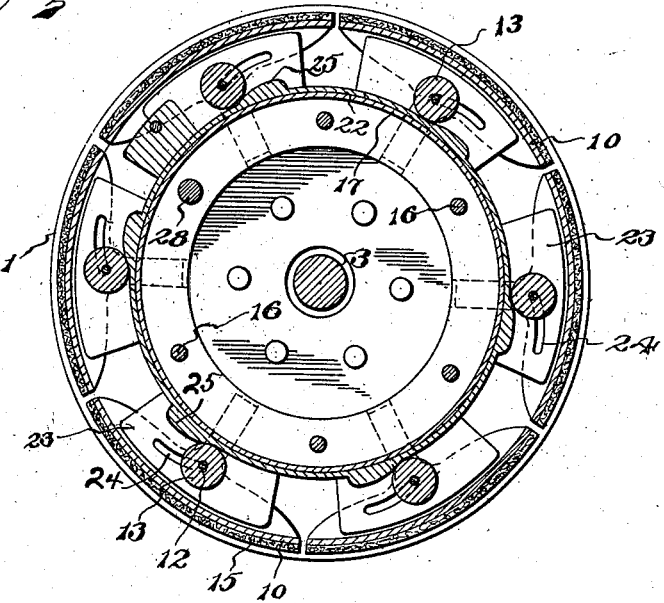
Figure 4 is a sectional view of the brake mechanism on the line 4—4 of Figure 6.

The brake frame is bolted or otherwise secured to the supporting plate 1 or 1ª, and comprises a band 17, an outer flange 18 and spaced inner flanges 19 and 20. The flanges 18 and 19 are flush at their outer sides so as to lie against the supporting plate to which the frame is attached. The flange 20 is set inward from the outer edge of the band 17 to sustain the thrust of the bolts 16 which connect the frame to the supporting plate and prevent interference thereof with the brake drum or plate thereof attached to the wheel. The bolts 16 connecting the frame to the supporting plate pass through openings formed in the flanges 19 and 20. Guide openings 21 are formed radially in the flanges 19 and 20 and are adapted to receive and coact with the guide arms 14 of the brake shoe to retain the latter in predetermined position and direct them in their radial movement. The brake shoes 10 are spaced apart a small distance, as indicated most clearly in Figures 4 and 5. A ring 22 is loosely mounted upon the band 17 of the brake frame and is provided at regular intervals with spaced wings 23 in which are formed cam slots 24 through which end portions of the pins 12 loosely pass. A pair of wings 23 and a cam lift 25 are provided for each of the brake shoes, the lifts 25 engaging under the rollers 13 to move the same outwardly and to cause the brake shoes to frictionally engage the inner side of the brake drum 8. Rotation of the brake operating ring 22 in one direction moves the brake shoes outwardly by causing the cam lifts 25 to ride under the rollers 13. Rotation of the ring 22 in a reverse direction draws the brake shoes inwardly and releases the brake. This is effected by the cam slots 24 engaging the projecting ends of the pins 12 and moving the same inwardly. The outwardly disposed arms 14 of the brake shoes pass through slots 26 formed in the brake operating ring 22 adjacent the outer set of wings 23. The brake operating ring 22 is moved in one direction to apply the brakes and is returned to normal position when released by means of a contractile spring 27. A shaft 28 mounted in the brake frame and the supporting plate to which the brake frame is attached is provided at its outer end with oppositely disposed arms 29 and 30. The contractile spring 27 connects the inner arm 29 with the brake frame, and a pin 31 connects the outer arm 30 with a lug 32, projecting outwardly from the brake operating ring 22. The pin 31 is fast to the lug 32 and passes through a slot 33 formed in a retaining ring 34 mounted upon the outer marginal portion of the band 17 and held in place thereon by means of cotter pins 35 or other suitable fastening means. It is observed that the brake operating ring 22 is confined between the flange 18 at the inner edge of the band 17 and the retaining ring 34 on the outer edge portion of said band 17.

The shaft 28 is adapted to be operated in any determinate way according to the installation of the brakes. An arm 36 is fast to the inner end of the shaft 28 and the operating part, such as a foot lever or hand lever, not shown, is adapted to be connected to the arm 36 to effect a turning of the shaft 28 to set the brakes when required, it being observed that during the setting of the brakes, the ring 22 is moved against the tension of the spring 27, and when the brake applying force is released the spring 27 operates to return the parts to normal position and release the same.

Figure 2:
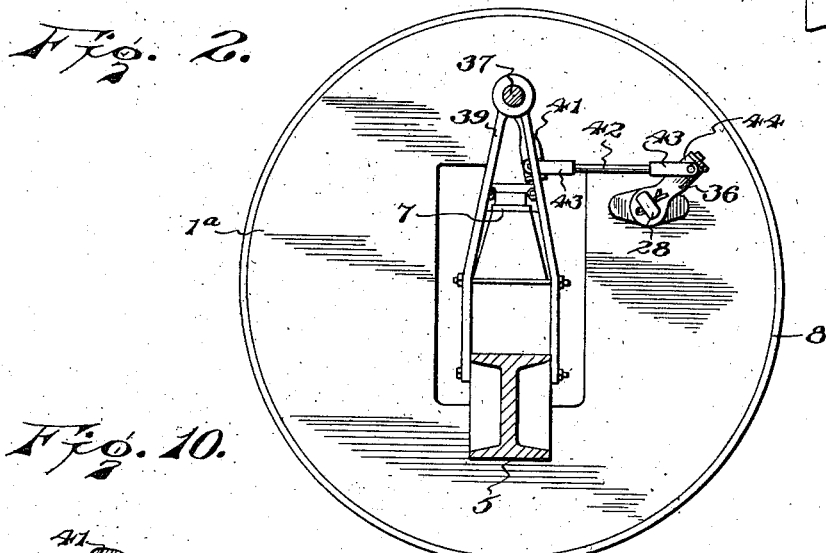
Figure 2 is a detail sectional view on the line 2—2 of Figure 1, looking towards the right, as indicated by the arrows, the wheel being omitted.
Figure 10:
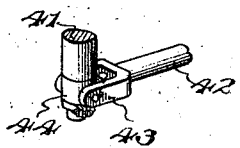
Figure 10 is a detail perspective view of a universal joint in the brake connection.
Figure 3:
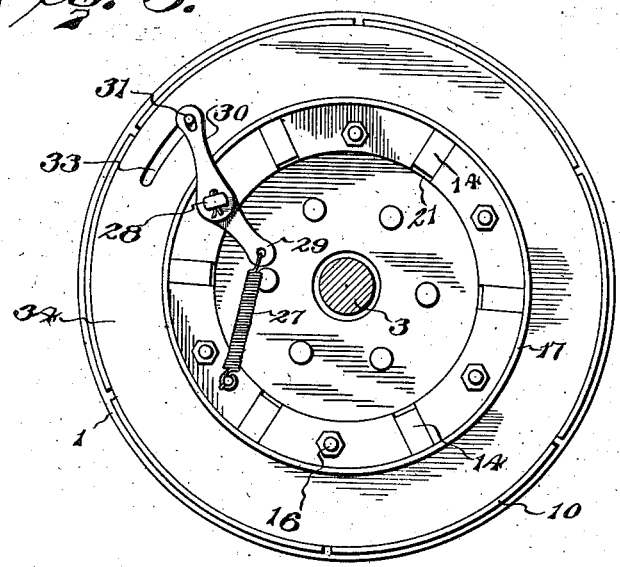
Figure 3 is a view of the brake mechanism, as seen from the outer or wheel side, the spindle being in section.

In the construction shown in Figures 1 and 2, a shaft 37 is mounted in standards 38 and 39 bolted, or otherwise secured to the axle 5 and is provided with two arms 40 and 41. The arm 40 is adapted to be connected in any convenient and preferred way to the foot or hand lever, not shown. The arm 41 is connected by means of a rod 42 with the arm 36, there being a universal connection between the arm 41 and the rod 42, and a similar connection between the said rod 42 and the arm 36. This connection is shown most clearly in Figure 10, and compensates for the relative position of the parts incident to a setting of the brakes when the front wheel is adjusted to different angles incident to steering. A fork 43 is connected to the rod 42 by means of a swivel joint and this fork is pivoted to a ring 44 loosely mounted upon the arm 41, or 36.

Having thus described the invention, I claim:

1. In a vehicle brake, a plurality of radially movable brake shoes grouped about an axis, and a brake operating ring provided with cam lifts adapted to move the brake shoes outwardly, and other means for moving the brake shoes inwardly consisting of pins and cam slots.

2. A brake of the character specified comprising a frame provided with radial openings, brake shoes having inwardly disposed arms mounted in the said radial openings, a ring provided with cam lifts for moving the brake shoes outwardly, and a pin and cam slot connection between the brake shoes and ring to effect an inward movement of the brake shoes upon imparting a reverse movement to the said ring.

3. A brake of the character specified comprising a frame, brake shoes mounted upon the frame to move radially, rollers carried by the brake shoes, a brake operating ring provided with cam lifts to engage the rollers and move the brake shoes outwardly, and a pin and cam slot connection between the brake operating ring and brake shoes to effect an inward movement of the latter.

4. A brake of the character specified comprising a frame provided with radial openings, brake shoes having inwardly disposed arms mounted in the said openings, rollers, pins connecting the rollers with the brake shoes and a brake operating ring provided with cam lifts to coact with said rollers to move the brake shoes outwardly and having cam slots to receive the pins upon which the rollers are mounted to effect a positive inward movement of the brake shoes.

5. A brake of the character specified comprising a frame including a circular band and spaced flanges, and having radial openings formed therein at regular intervals, brake shoes provided with guide arms mounted in the openings of the frame, and a brake operating ring mounted upon the said band and provided with cam lifts for moving the brake shoes outwardly and having cam slots to engage projecting portions of the brake shoes to effect an inward movement thereof.

6. A brake of the character specified comprising a supporting plate, a frame carried thereby and comprising a band and spaced flanges and having radially disposed guide opening at regular intervals, brake shoes grouped about the frame and provided with webs and guide arms, the latter engaging the said guide openings, rollers disposed between the webs of the brake shoes, pins passing through said webs and supporting the rollers and having their ends projecting, a brake operating ring mounted upon the band and provided with cam lifts to engage the rollers of the brake shoes, and provided with spaced wings in which are formed cam slots to receive the projecting end portions of the pins upon which the rollers are mounted, a shaft mounted in the frame and having an arm at one end to which the brake operating means is adapted to be connected, oppositely disposed arms at the other end of said shaft, means connecting one of the last mentioned arms with the brake operating ring, and a spring connecting the other arm with the brake frame.

In testimony whereof I affix my signature.

RAYMOND G. ELLIS. [L. S.]